United States Patent Office
3,671,249
Patented June 20, 1972

3,671,249

PHOTOSENSITIVE CUPROUS NITRATE COMPOSITIONS AND PROCESS FOR PREPARING AND USING SAME

Thomas E. Flynn, 95 Court St., Portsmouth, N.H. 03801

No Drawing. Filed Mar. 20, 1970, Ser. No. 21,492
Int. Cl. G03c 1/00
U.S. Cl. 96—88 10 Claims

ABSTRACT OF THE DISCLOSURE

Photosensitive compositions containing cuprous compounds, particularly cuprous nitrate, as the photosensitive component are prepared. The compositions are used in photographic materials and processes to provide copper images.

BACKGROUND OF THE INVENTION

This invention relates to the preparation and utilization of photosensitive compositions, materials and articles wherein the photosensitive component is a cuprous compound. The invention is of value in the following technical areas: replacement of silver in photographic emulsions; a direct printing ink; a touch-up in weak printout areas of tracings; as a photoresist in the manufacture of printed circuits; to make pictures instantly; to plate mirrors in copper; to produce stencil transfers for glass and other carriers; in the manufacture of blueprints; and in papers for photoduplicators.

It is well known that many copper salts are photosensitive. However, most of the research in this art has been expended on the perfection of the photo-responsive properties of silver compounds because of the latter's inherent superior properties for most applications. Today, however, the cost of silver compounds has advanced to the point that significant cost reductions could be realized if processes were developed wherein copper salts could be substituted for silver compounds without resulting in an unacceptable loss of photo-responsive properties.

SUMMARY OF THE INVENTION

It is therefore an object of this invention to prepare and utilize copper salts, particularly cuprous nitrate, in compositions which may be employed in the photo-responsive processes which are listed above.

A great many of the copper salts and virtually all of the cuprous salts, are photosensitive, and under proper conditions, the emulsion speed approaches that of the well known silver compounds. Thus an image of either black copper or pure metallic copper may be formed on a great many substrates in accordance with the desired result. Among the several cuprous salts which are usable in this invention cuprous nitrate is the most photosensitive.

Cuprous nitrate as a direct printing ink, opens up an entirely new printing concept. For the first time, a photosensitive solution can be employed directly on any reasonable surface as a clear fluid. The printing solution containing cuprous nitrate is allowed to dry after application and is developed in a standard photographic developer, such as Kodak's Dektol, rinsed and dried. A bright yellow gold metallic copper has been plated on the support. On some finishes a wetting agent such as Kodak's "photo-flow," may be required to perform a firm transfer.

Cuprous nitrate, employed on a transparent film base such as Kodak's Estar and treated by the standard techniques employed in film manufacture; i.e., with activators and sensitizers, gives a fast film of moderately fine grain that yields black copper on development by standard methods.

There is very little information in the published literature on cuprous nitrate. It is mentioned fleetingly in Mellor's "Encyclopedia of Chemical Technology" (1949), vol. 1, page 471. Mellor states that cuprous nitrate is formed when cupric nitrate in liquid ammonia is placed in contact with copper foil. It is said that the cuprous nitrate thus formed, rapidly oxidizes on exposure to air.

According to the present invention, cuprous nitrate is formed by the reaction of silver nitrate with cupric halide and the resulting cuprous nitrate is kept from oxidizing by incorporating it directly into gelatin. It has been found that the cuprous nitrate made by the present process further contains some halide ion. The product composition may therefore be characterized as a light sensitive gelatin composition containing cuprous-halo-nitrate.

The light sensitive composition of the invention may be prepared by adding a saturated solution of silver nitrate to a substantially equal amount of a fresh aqueous solution or suspension of cuprous chloride .The silver nitrate and cuprous chloride may be in substantially equimolar proportions, but preferably there is a slight excess of the cuprous chloride. One or both of the solutions may contain a small quantity of gelatin, e.g. up to about 5%. The mixture is stirred constantly as the two solutions are poured together. Silver chloride is immediately precipitated and can be recovered, thereby conserving silver which is a total loss in other photographic processes. The solution or suspension of cuprous chloro-nitrate, which is decanted or otherwise separated from the precipitated silver chloride, is then mixed with more concentrated gelatin solution which may be stored or used immediately as a photographic emulsion for preparation of films, printing inks, and other articles and materials as mentioned above. If the gelatin emulsion is not used immediately it is chilled and covered with plastic film, e.g. "Saran" wrap or some other equally acceptable substance to exclude air. The covering is left in place until such time as activators, optical sensitizers and other materials may be added. The invention contemplates that activators, sensitizing dyes, wetting agents, hardeners, stabilizers etc. as known in the photographic arts may be employed. It will be understood that cuprous bromide or iodide may be used in lieu of the cuprous chloride described above.

DETAILED DESCRIPTION

The folowing examples will serve to illustrate the principles of the invention.

Example 1.—Preparation of a cuprous (chloro)nitrate solution

Cuprous chloride solution is prepared by reacting 500 cc. of concentrated HCl with 400 grams of pure copper and 600 grams of cupric chloride at 180° F. After the reaction is complete the reaction mass is poured into 800 cc. of distilled water, the resulting material is poured over filter paper and the filter washed with three 800 cc. portions of distilled water. The combined cuprous chloride filtrates are stored for use in brown bottles.

Cuprous chloride solution, freshly prepared as above, is added to a saturated solution of silver nitrate with constant stiring until a molar excess of cuprous chloride has been added. The stirring should be of such a nature as to thoroughly mix the two solutions but not create any beating. Magnetic stirring is preferred. This excludes air from the reaction system and therefore prevents the oxidation of the freshly formed cuprous nitrate. As the two solutions are mixed, there is an immediate reaction which results in the precipitation of silver chloride which is subsequently recovered. The cuprous (chloro)nitrate solution which is decanted or otherwise removed from the precipitate is highly sensitive to light and is the base for the photographic process, the printing ink and the plating of mirrors as will be shown in the examples that follow.

Example 2.—Preparation of a photographic film

The cuprous (chloro)nitrate solution of Example 1 is ammoniated so that it's pH is adjusted to about 7.5 to make it compatible with gelatin. The resulting solution is added to a 10% gelatin solution in a ratio of 10 grams of cuprous (chloro)nitrate solution per 100 ml. of gelatin solution. The mixture is heated to 85 to 90° F. in order to facilitate the mixing and stirred very carefully, preferably with a magnetic stirrer in order to exclude as much air as possible. The solution is then removed from its heat source, cooled, and refrigerated for 24 hours. It is then reheated slowly with careful stirring to about 85° F., coated onto the desired support, immediately chilled in an ice water bath and dried rapidly, preferably in a partial vacuum. The film is then stored until use.

At this point, sensitizers and other additives may be added to the film. One sensitizer composition which is compatible with the composition of this invention is a mixture of one gram of anthracene, one half gram of hydroquinone, and seventy milliliters of methanol. The sensitizer is poured into a tray into which the film has been previously placed. The tray is then agitated until the film surface is completely covered with sensitizer, about 30 seconds, and the sensitizer is then decanted. The film is then washed with distilled water and rapidly dried before being stored in a cool, air tight container until it is used. This is only one of the many methods that can be employed for sensitization with the optical dyes and activators known to the art.

Example 3.—Preparation of a copper mirror

Two cuprous nitrate solutions are first prepared. The first solution is prepared by boiling 8 oz. of water and adding thereto 7 ml. of cuprous nitrate solution or suspension (Example 1) and 12 grains of dry Rochelle salts. Stir, while allowing the solution to boil for 6 to 7 minutes, then cool before filtering. The second solution is prepared by adding to 8 oz. of distilled water, 12 ml. of cuprous nitrate suspension and 21 drops of ammonia solution (26%), which is stirred until the cuprous nitrate is dissolved. The ammonia is added to the solution one drop at a time until the cuprous nitrate has just dissolved. Then add an additional 9 ml. of cuprous nitrate suspension followed by a second quantity of ammonia, in the same manner as the first. However, the ammonia is added in a quantity to almost, but not quite, dissolve the nitrate.

The two solutions are mixed in equal volumes and immediately poured over the glass to be plated until the glass is covered to a depth at least as thick as the glass itself. After the solution has been allowed to stand for 8 to 10 minutes, it is removed and the plated surface is then washed with distilled water and dried very carefully with a clean chamois.

Example 4.—Cuprous nitrate as a printing ink

Cuprous nitrate as prepared in Example 1 is applied in a predetermined pattern, to a base or substrate as a clear solution. After the solution has dried, it is treated with a commercial developer, such as "Dektol," rinsed and dried. As a result, a bright yellow gold metallic copper pattern has been plated on the base. Bases which are envisioned for this process include paper, leather, wood, plasterboard, and other non-conducting supports.

Example 5.—Formation of printed circuits

Copper can be rapidly selectively coated on a nonconductive surface thereby quickly producing such widely used articles as printed circuits by the following process: A negative which has been made from a gelatin emulsion of a cuprous salt e.g., cuprous nitrate or cuprous halide is first exposed to a line drawing. Then, in a dark place, the negative is placed face up in a tray and covered with water. Remove the water, immediately cover the moist negative with a commercial developer e.g., Kodak "Dektol," and agitate the tray for about a minute and one half. Place the transfer positive at one end of the most negative and smoothly contact the two faces with each other. Immediately remove the assembled positive and negative from the tray. After an appropriate interval of time, one minute or longer, separate the assembly. In the event the copper density of the transferred image is inadequate, the copper coated positive may be placed in a copper sulfate electroplating bath for a short time to cure this deficiency.

All of the cuprous salts the lightsensitive, some such as cuprous nitrate to a greater degree than others. Amplification of the sensitivity of all of the cuprous salts can be performed by the addition of sensitizers and activators.

Ammoniated cuprous chloride can be supported in gelatin in the following manner with satisfactory results, although the emulsion speed will be much slower than with cuprous nitrate.

Example 6

Add 10 grams photographic quality gelatin to 100 ml. of distilled water, allow to stand for 5 hours at room temperature. Add 5 grams cuprous chloride (ammoniated to 7.5 pH), heat the gelatin to 85° F. and stir with a magnetic stirrer at a very low speed to exclude air bubbles. Coat the gelatin on the desired support. Chill in ice water, potassium bromide (5%) for 30 seconds then rinse in distilled water for 15 seconds and place in a fluorescent dye such as anthracene, fluorescein or one of the pina type dyes, for example, the optical sensitizers pinachrome, pina verdol and pinacyanol cover the visible area of the spectrum. Other optical sensitizers (commonly used in the photographic industry), such as the cyanines, lend themselves readily to the process.

The foregoing examples have been selected to illustrate two points, the useful photosensitivity of cuprous compounds and that by the newly devised techniques of this invention, the instability of cuprous nitrate, the most photosensitive of the cuprous compounds, can be overcome.

Where reference is made to a commercial developer it is understood that any of the photographic developers recommended for use with silver halide emulsions may be used with the present invention. Those containing a reducing agent such as hydroquinone and/or N-methyl-p-aminophenol, an accelerator such as sodium carbonate, a preservative such as sodium sulfite and sodium bisulfite, a restainer such as potassium bromide and minor amounts of miscellaneous additives such as sequestering agents and wetting agents are quite suitable. (Reference is made to Clark et al.—The Encyclopedia of Chemistry—Reinhold Publishing Corporation, N.Y., 1957, pp. 294–5.) For example, in lieu of Kodak "Dektol," a solution of about 3.0 g. of N-methyl-p-aminophenol, 6.0–12.0 g. of hydroquinone, 45–90 g. of sodium sulfite, 2.0 g. of sodium bisulfite, 12 to 90 g. of sodium carbonate and 2.0 g. of potassium bromide per liter of water, may be used.

I claim:

1. A process for the preparation of a photosensitive cuprous nitrate composition comprising reacting cuprous halide in aqueous medium with silver nitrate to provide cuprous nitrate and silver halide, removing the resulting precipitate of silver halide and mixing the resulting cuprous nitrate solution with gelatin to form an emulsion.

2. The process of claim 1 wherein the cuprous halide is cuprous chloride.

3. The process of claim 1 including the steps of coating a base material with said emulsion and drying the coating.

4. A photosensitive composition comprising cuprous nitrate incorporated in gelatin.

5. The photosensitive composition of claim 4 in which halide ion is also present.

6. A photosensitive material comprising a base, coated with a gelatin solution containing cuprous nitrate.

7. A method for the preparation of a photosensitive cuprous nitrate film which comprises heating a gelatin solution, mixing therewith a solution of cuprous nitrate whose pH has been adjusted with ammonia so as to be compatible with the gelatin, coating a base film with a layer of the resulting gelatin emulsion and chilling the gelatin layer.

8. The method of claim 7 wherein the mixing is conducted while substantially excluding air.

9. A method of claim 8 in which the photosensitive cuprous compound comprises cuprous nitrate in gelatin.

10. A method of applying a selected copper coating to a non-conductive base which comprises activating the face of a negative comprising a gelatin layer containing cuprous nitrate, placing a positive in a smooth uniform contact with the treated negative for an appropriate length of time, and then separating the negative from the positive so as to transfer the copper image from the negative to the positive.

References Cited

UNITED STATES PATENTS

| | | | |
|---|---|---|---|
| 2,084,420 | 6/1937 | Weyde | 96—88 X |
| 2,336,299 | 12/1943 | Russell | 96—88 X |
| 2,559,370 | 7/1951 | Reidel | 23—102 X |
| 3,206,308 | 9/1965 | Bean | 96—28 |
| 3,409,432 | 11/1968 | Gilman | 96—88 X |

NORMAN G. TORCHIN, Primary Examiner

W. H. LOUIE, JR., Assistant Examiner

U.S. Cl. X.R.

96—28; 23—87, 102